June 13, 1967 R. C. BOLESKY 3,325,329
METHODS AND APPARATUS FOR MAKING CUSHIONED ARTICLES
Original Filed Feb. 8, 1961 3 Sheets-Sheet 1
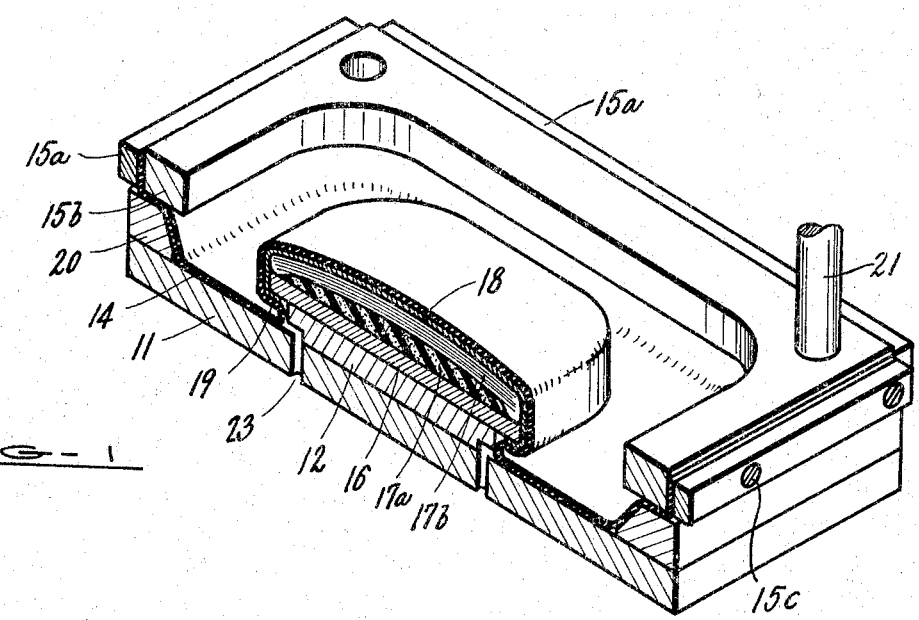
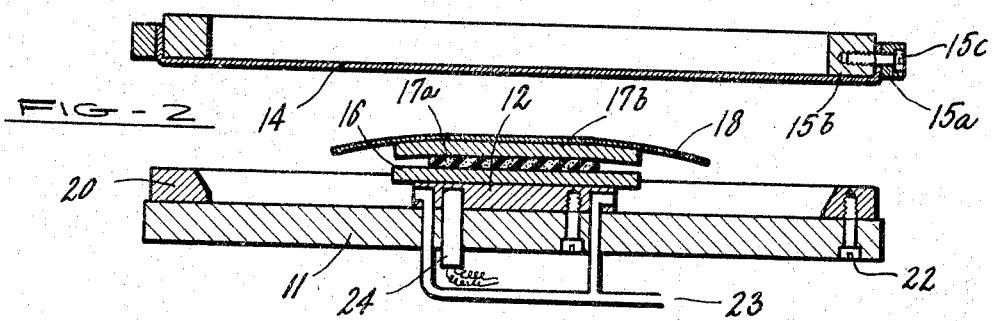
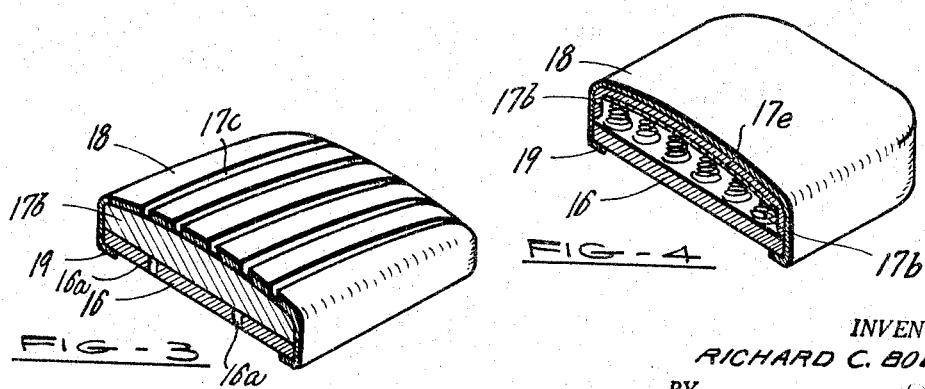
INVENTOR.
RICHARD C. BOLESKY
BY
ATTORNEY

INVENTOR.
RICHARD C. BOLESKY
BY
ATTORNEY

INVENTOR.
RICHARD C. BOLESKY
BY
ATTORNEY

United States Patent Office 3,325,329
Patented June 13, 1967

3,325,329
METHODS AND APPARATUS FOR MAKING CUSHIONED ARTICLES
Richard C. Bolesky, Warsaw, Ind., assignor to Uniroyal, Inc., a corporation of New Jersey
Continuation of application Ser. No. 87,973, Feb. 8, 1961. This application Nov. 18, 1964, Ser. No. 414,491
8 Claims. (Cl. 156—216)

This application is a continuation of my copending application, Ser. No. 87,973, filed Feb. 8, 1961, now abandoned and which was assigned to the assignee of the present application.

This invention relates to methods and apparatus for making cushioned articles by a vacuum forming technique, and to the cushioned articles made thereby. More particularly, it relates to simplified methods and apparatus for manufacturing these cushioned articles without employing a hydraulic press and molds. The invention may be used to make cushioned articles such as seats, seat backs, safety and decorative paddings and the like.

In another copending application, Ser. No. 837,275, filed Aug. 31, 1959, now U.S. Patent 3,068,138, a method of manufacturing upholstered cushioned items by mechanical means is described by Alex Friedman. Although this method is workable, it has two costly requirements which I have sought to eliminate, viz. (1) the need for an expensive press to carry out the forming operation and (2) the need of a system of matched metal molds, or a single metal mold.

The present invention overcomes these disadvantages as well as the disadvantages inherently present in prior methods and apparatus for making cushioned articles which methods and apparatus usually involved costly and cumbersome hand operations such as stretching the covering material over the padding and base or frame and attaching it thereto by tacking or some other means.

It is an object of my invention to provide an improved single step method of forming upholstered cushions having high durability.

Another object of my invention is to provide improved apparatus for forming upholstered cushions.

According to my invention and by means of the apparatus and method herein described, upholstered cushions of various sizes and shapes can be produced on a mass production scale with corresponding reduction in labor costs, and with a uniformity of construction not heretofore attained.

Other objects and advantages will be apparent from the drawings appended hereto and from the description which follows.

FIG. 1 is a fragmentary perspective view, partly in section, showing a diaphragm drawn firmly around the upholstered cushion assembly which assembly rests on a raised member of a vacuum table.

FIG. 2 is a partial cross-sectional view and side elevation showing the cushion assembly in place on the raised member of the vacuum table prior to drawing the flexible diaphragm around said assembly by vacuum means.

FIG. 3 is a fragmentary perspective view, partly in section, of a finished cushion showing one of many intricate designs made possible by this process.

FIG. 4 is a fragmentary perspective view, partly in section, of a finished cushion showing springs as the padding member of the assembled cushion.

Figure 5:
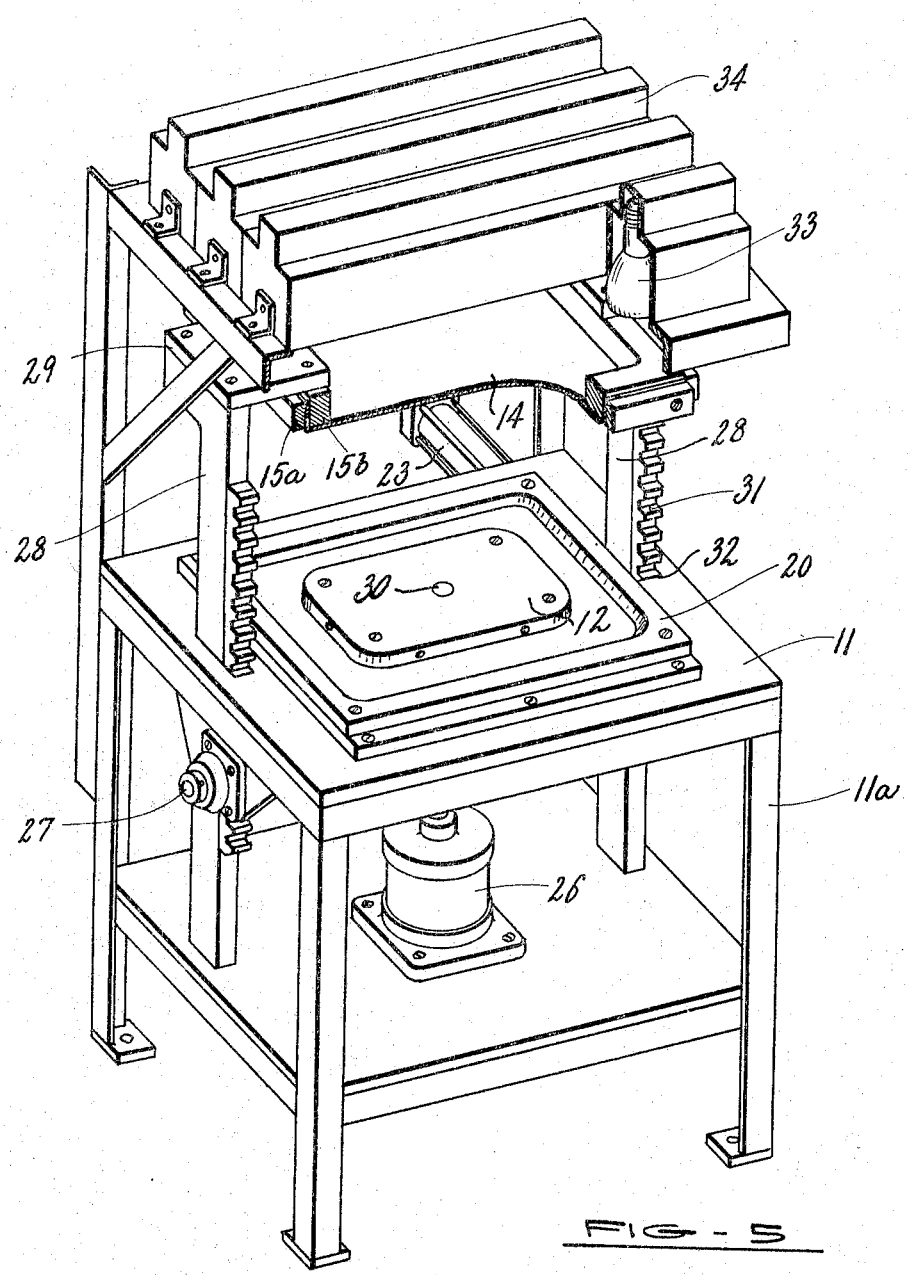
FIG. 5 is a perspective view, partly in section, of the vacuum forming apparatus.

Referring now to the drawings and more particularly to FIGS. 1 and 2 thereof, the basic apparatus consists of a vacuum table member 11, an elastomeric diaphragm 14 held in a perimetrical flange or frame 15a and 15b by screw means 15c. The vacuum table 11 has a platform or raised member 12, illustrated as a flat raised member in FIGS. 1 and 2, disposed centrally on the working surface thereof. A piece of cardboard, wood or fiberboard, or similar somewhat stiff material 16 having a surface area larger than the raised member 12 of the vacuum table 11 is centered on the upper surface of said raised member 12 so that it has an overhanging edge, e.g. when the raised member 12 and the support 16 are both circular in shape, a support 16 having a diameter approximately two inches larger than the raised member 12 is adequate. The underside or lower surface of the support 16 is previously coated with an adhesive in that portion which is in close proximity to the vertical edges thereof, e.g. inwardly about one inch from said edges. A core of resilient padding material 17b, such as latex foam rubber, and which may consist of a second layer of such padding material 17a depending on the desired shape of the finished item, is centered on the hard and rigid support 16. Next a sheet of fabric covering 18 is applied over the core of resilient padding material 17b; this fabric covering 18 is pre-cut in a shape similar to but slightly larger than the upper surface of the support 16 so that the ends of the covering extend beyond the vertical edges of the support when placed centrally over the core of padding material 17b. The under surface of the fabric covering 18 is previously coated with adhesive in that portion 19 which extends beyond the edges of the support 16.

When the elements 16, 17b, 18, and 17a when desired, are assembled on the raised member 12 of the vacuum table 11, the diaphragm 14 is lowered onto the table 11 and the air is evacuated between the diaphragm 14 and the surface of the vacuum table 11 by means of the vacuum lines 23. Instead of lowering the framed diaphragm 14 directly onto the vacuum table 11, it may be desirable for the inner portion of the diaphragm frame 15b to rest on a flange or elevated portion 20 which is attached to the upper surface of vacuum table 11 by screw means 22. This elevated portion 20 encloses the raised member 12 of the vacuum table 11 and the cushion assembly comprised of 16, 17b, and 18. The diaphragm 14 forces the under surface of the fabric covering 18 into contact with the adhesive coated under surface of the support 16 in the area 19 near the vertical edges of said support. The drawing of the diaphragm 14 around the assembly of 16, 17b, and 18 causes the fabric covering 18 to be pulled taut and bonded to the underside of the support 16 in the areas 19 near the vertical edges of the support.

It should be understood that my cushioned articles may be made on a flat surfaced vacuum table 11, i.e. one which does not contain a raised member 12. With this apparatus the adhesive cement is applied to the vertical edges of the support 16 instead of the under surface of said support and the covering fabric 18 is bonded by the action of the diaphragm 14 to the support at these vertical edges. This being so, the padding material cannot be placed over these vertical edges of the support 16 when making a cushioned article with this apparatus.

If the adhesive which is previously placed on the under surfaces of the support 16 and the fabric covering 18 is a heat sensitive adhesive, e.g. a polyvinyl acetate water base adhesive, it may be desirable to have a heating element 24 enclosed within the raised member 12 of the vacuum table 11. The diaphragm 14 may also be heated before lowering same onto the vacuum table 11. A heated diaphragm alone is sufficient to activate the heat sensitive adhesive on the underside of the support 16 in the area 19 near the vertical edges of said support. A diaphragm heated to from 150° F. to 300° F. generally will suffice for most heat-sensitive adhesive composition.

The vacuum is maintained until the adhesive sets, e.g. one minute or so should suffice for most adhesives, and then is released. The diaphragm 14 is raised and the finished upholstered cushion is removed.

Figures 6, 7:
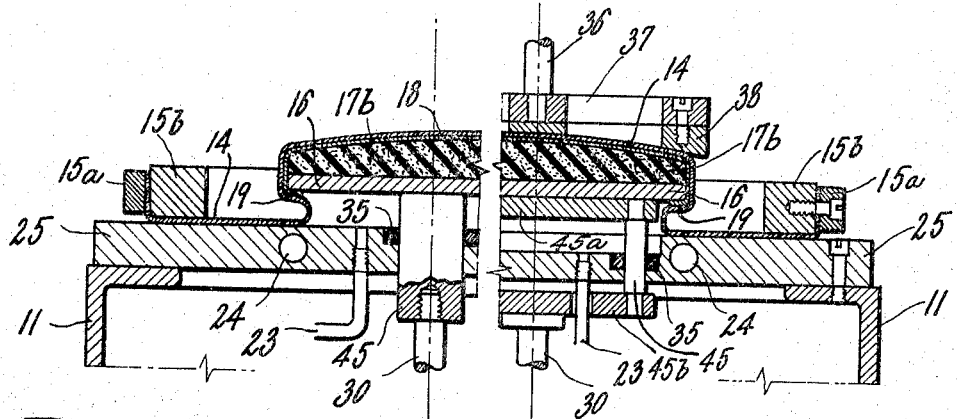
FIG. 6 and FIG. 7 are fragmentary partial cross-sectional and side elevations showing the use of various modifications, including heated platens, retractable elevated member, and upper helper member or presser foot.

In the modification shown in FIG. 6, a heated platen 25 may be employed to insure adhesion between the fabric covering 18 the underside of the support member 16. Lower piston 45 connected to rod 30 is slidably fitted both through platen 25, which platen contains a heating element 24, and through the table 11. The piston 45 replaces the raised member 12 of the vacuum table 11 shown in FIGS. 1 and 2, the head of the piston 45 being above the table 11 when piston 45 is in its uppermost and rest position. A sealing ring 35 is employed to insure an air tight seal between the piston 45 and the heated platen 25. The cushion assembly 16, 17b and 18 is the same as shown in FIGS. 1 and 2, although in this illustration only one layer of padding material 17b is used. The elastomeric diaphragm 14 is placed over the assembly 16, 17b and 18 and onto the heated platen 25. Air is evacuated through vacuum line 23 to draw the diaphragm 14 firmly around the assembly 16, 17b and 18 with said assembly on a raised piston 45 as shown in FIG. 6. At full vacuum the piston 45 is lowered by rod 30 in order to allow the bottom of the assembly 16, 17b and 18 to be pressed against the heated platen 25 by the action of the evacuated diaphragm 14. This insures better adhesion between the covering fabric 18 and the underside of the support member 16 when a heat sensitive adhesive is employed.

Additional pressure can be supplied to the assembly 16, 17b and 18 to force said assembly against heated platen 25 by lowering rod 36 with presser foot 38 as shown in FIG. 7. The presser foot 38 may be contoured to follow the contour of the finished cushion and it may contain a radiant heating source, the holes 37 for which are shown in FIG. 7. When a support member 16 of softer and less rigid composition is employed it is desirable to use a piston 45 with an upper head 45a and a lower head 45b in order to maintain the shape of the support member 16 during the manufacturing operation.

Figures 8, 9:
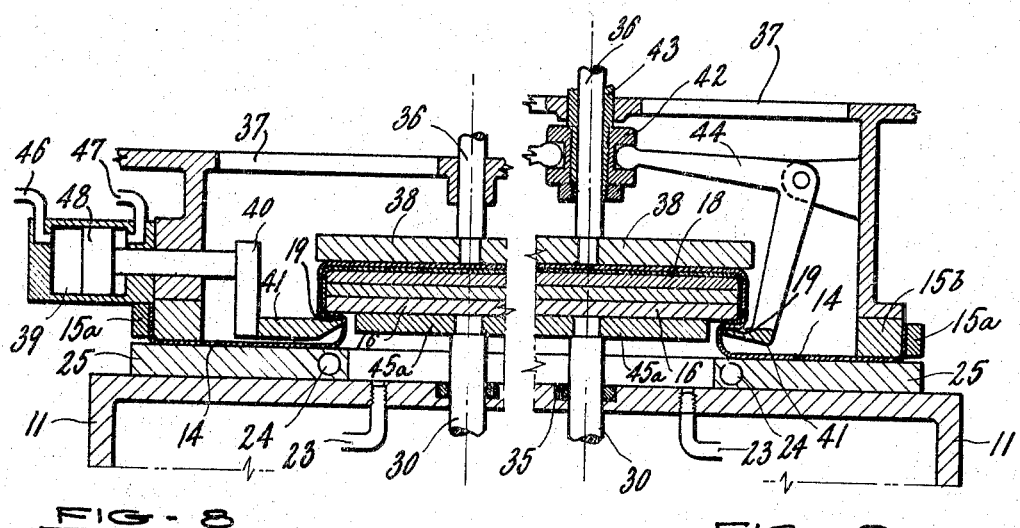
FIG. 8 and FIG. 9 are fragmentary partial cross-sectional and side elevations showing the use of various mechanical helper members.
Figure 10:
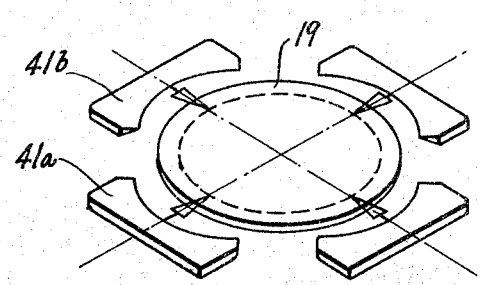
FIG. 10 is a perspective view of one such helper member.

Helper members 41, 41a and 41b may be employed to insure better adhesion between the covering fabric 18 and the underside of the supports 16 as shown in FIGS. 8, 9 and 10. The helper member 41 of FIG. 8 is air actuated in that air is introduced into chamber 39 through conduit 46 which conduit communicates with the head member 48 to force the helper member 41 attached to plate member 40 against the underside of the support 16 in the area of the adhesive 19. The helper member 41 is withdrawn by introducing air into chamber 39 through conduit 47. The helper member 41 of FIG. 9 operates by attachment to a bell crank lever 44 which in turn is actuated independently of presser foot rod 36 by means of a ball and socket joint 42 carried by sleeve 43 which is slideably disposed about rod 36. FIG. 10 illustrates the use of a plurality of these helper members 41a and 41b to insure uniform bonding in the area of the adhesive 19.

A cross section of a finished cushioned article is shown in FIG. 3 wherein the upper surface of the core of padding material 17b has been routed out in the area designated 17c. In this particular example foam rubber 17b is routed out on its upper surface in a design which appears as a depressed area 17c in the finished cushioned article. The covering fabric 18 can be vacuum formed to fit the routed out area 17c prior to assembly or it can be heated and formed during the vacuum process used in making the basic cushion article. The designs also may be accomplished prior to assembly by pre-sealing (by dielectric or heat and pressure) the covering fabric 18 to a sealable resilient material 17b.

It is necessary to have a plurality of holes 16a in the support 16, i.e. the wood, cardboard, or metal base, in all cases where the outer covering material 18 is air impermeable. This is usually accomplished by drilling five or six small holes 16a in the base support 16 to allow air to escape.

The cross-sectional view of the cushioned article in FIG. 4 shows the use of metal springs 17d. The metal springs 17d may be cemented into place on the support member 16 by any suitable adhesive. Generally, a layer of burlap 17e is placed over the adhered springs 17d, then a thin layer of padding material 17b (foam, curled hair, etc.) is placed over the burlap; then the assembly is completely covered with the fabric material 18. In this application it is preferable to use springs 17d of graduated height from center to edge in order to gain the ultimate contour in the desired cushion article.

The vacuum forming apparatus may be one complete unit as shown in FIG. 5 wherein the vacuum table 11 is supported by legs 11a. Radiant heat is supplied by infrared lamps 33 contained in housing 34. Support member 29 is attached to movable side bars 28 and the diaphragm 14 is attached to support 29. The toothed surface 31 of bars 28 provide for vertical movement through the vacuum table 11 at 32 by rack and pinion means. The downward movement of bars 28 causes the diaphragm 14, which is disposed centrally above the raised member 12 of the vacuum table 11, to be lowered over the cushion assembly (not shown) which previously has been centered on said raised member 12. Vacuum is applied through lines 23 as the diaphragm frame 15a and 15b contacts a frame 20 of corresponding size which is attached to the upper surface of the table 11. This forces the diaphragm 14 around the cushion assembly. The raised member 12 of the vacuum table 11 is moved vertically downwardly until the upper surface of said raised member is flush with or lower than the upper surface of said table. This is accomplished by rod 30 connecting the raised member 12 to a cylinder 26 containing a fluid actuated motor which is started by switch 27.

The base or support member of the cushion assembly generally is comprised of a hard and rigid material such as plywood, metal, shipboard, plastic, rigid rubber compositions, rigid cellular material, etc. My process is so rapid that it is possible to use a frozen soft material, such as foam rubber, as the support member and to form the finished cushion prior to thawing. Of course, with a frozen support member a pressure sensitive adhesive must be used.

A soft support member for the cushion assembly such as vinyl film, rubber-resin films, or any expanded or blown elastomeric composition, which is formable or castable into a shape or contour to fit over the raised member 12 of the vacuum table 11 shown in FIGS. 1 and 2 of the drawings, may be used to make my cushioned article. When employing a soft support member of the cushion assembly, the raised member 12 acts as a plug and, therefore, said raised member should have the same spatial form and outline as the finished article. The pre-formed or pre-cast soft support is placed over the raised member 12 so as to have a dependent rim along the periphery of said support. The outer surface of the dependent rim is coated with a suitable adhesive and the core of resilient padding material is centered on the support member. The assembly is covered with a pre-cut upholstery fabric, the under surface of which is coated with a film of adhesive in that portion which is adjacent to and makes intimate contact with the adhesive on the dependent rim of the support when the air is evacuated between the diaphragm 14 and the table 11. Thus, with a soft support member adhesive bonding occurs along the dependent rim thereof whereas with a hard and rigid support member the adhesive bonding may be entirely on the under surface of said support. The advantage of the latter is that the resilient padding material may be placed over the vertical edge of the support; a construction desirable in seat or cushions.

The core of padding material in my cushion assembly may be comprised of any conventional padding such as latex rubber foam, urethane foam, vinyl foam, curled hair, rubberized hair, excelsior, cotton wadding, wire, and insulated wire springs, or combinations of these materials. Anything that has resiliency may be employed as padding. The covering fabric of my cushion assembly may be any conventional upholstery fabric or film. By "covering fabric" I include natural and synthetic fabrics such as cloth, leather, coated fabrics, non-continuous or breathable coated fabrics, vinyl films, rubber-resin blends, etc.

Any of a number of thermosetting, thermoplastic and pressure sensitive adhesives may be used in my process. A suitable heat sensitive adhesive is an aqueous dispersion of polyvinyl acetate resin containing about 55% to 60% solids dispersed therein and a suitable pressure sensitive adhesive is the neoprene-phenolic cement described in U.S. Patent No. 2,918,442. Adhesive is applied to the vertical edges and under side of the pre-shaped support member of the cushion assembly near the vertical edges thereof. Adhesive also is applied to that portion of the under side of the pre-cut covering fabric which will make contact with the adhesive on the under side of the support when said covering is fully extended or stretched by the action of the elastomeric diaphragm or the back of the covering fabric may be completely coated with adhesive prior to being die cut.

The diaphragm used in my process may be any flexible elastomer having sufficient hot film strength to permit vacuum drawings. A latex having good elongation at both ambient and elevated temperatures can be used. However, I prefer to use a diaphragm of vinylidene fluoride-hexafluoropropylene rubbery copolymer, which is high heat-resistant rubber marketed by E. I. du Pont de Nemours and Co., Inc. under the registered trademark "Viton." Such diaphragms can withstand temperatures of 300° F. and above during continuous use and temperatures of 500° F. for occasional use.

Since changes and modifications may be made by those skilled in the art in the above description without departing from the nature or spirit thereof, I do not intend that my invention is to be restricted to the techniques and embodiments illustrated herein except as set forth in the appended claims.

Having thus described my invention, what I claim and desire to protect by Letters Patent is:

1. A method of making a cushioned article having a rigid support comprising the steps of: supporting said support at a point intermediate its edges; placing a core of resilient padding material on said support; placing a flexible cover over said core, the edges of said cover extending over the vertical edges of said support; applying adhesive to the adjacent surfaces of at least one of said cover and said support; contacting the upper surface of said cover with a flexible substantially planar elastomeric diaphragm; and drawing said diaphragm firmly over said cover and around the edges of said support; whereby said core is held in a compressed condition while said cover is pulled taut and bonded to said support in the area of said adhesive.

2. A method of making a cushioned article having a rigid support comprising the steps of: placing a core of resilient padding material on said support; placing a flexible cover over said core, the edges of said cover extending over the vertical edges of said support; applying adhesive to the adjacent surfaces of at least one of said cover and said support; supporting said support at a point intermediate its edges; contacting the upper surface of said cover with a flexible substantially planar elastomeric diaphragm; drawing said diaphragm firmly over said cover and around the edges of said support to thereby compress said core and cause said cover to be pulled taut and bonded to said support; and applying additional force to the outer surface of said cover in the area of said adhesive to increase the bond between said cover and said support.

3. The method of claim 2 wherein said additional force is applied by moving helper members into contact with said diaphragm in the area of said adhesive.

4. The method of claim 2 wherein said additional force is applied by lowering said support against a fixed surface while maintaining said diaphragm firmly about said support.

5. Apparatus for fabricating a cushioned article having a rigid support, a core of compressed resilient padding material, and a flexible cover, comprising: a frame; a horizontally disposed first member carried by said frame and including a surface adapted to support said rigid support intermediate its edges; a second member spaced apart from said first member and including a substantially planar diaphragm as a part thereof adapted to overlie the surface of said first member; means for moving one of said members against the other of said members so that a sealed chamber is formed therebetween; and means for evacuating air from the portion of said chamber between said surface and said diaphragm so that said diaphragm is drawn firmly over said cover and around the edges of said support; whereby, said core is held in a compressed condition while said cover is pulled taut and bonded to said support.

6. The apparatus of claim 5 further comprising means in addition to said diaphragm for applying pressure to said cover to increase the bond between said cover and said support.

7. The apparatus of claim 6 wherein said surface for supporting said rigid support is vertically movable and said additional pressure is applied by lowering said support, with said cover around the edges thereof, into contact with a fixed member.

8. Apparatus for fabricating a cushioned article having a rigid support, a core of compressed resilient padding material, a flexible cover, and heat-sensitive adhesive for joining the cover to the support, said apparatus comprising: a frame; a rigid horizontal heated table member fixedly carried by said frame; a vertically movable platform carried by said table and adapted to support said rigid support intermediate its edges; a diaphragm supporting member having a rigid perimetrical flange and a central opening covered by a flexible substantially planar elastomeric diaphragm; means for moving said diaphragm supporting member into abutment with said table member to thereby form a sealed chamber surrounding the component parts of said cushioned article; means for evacuating air from said chamber so that said diaphragm is drawn firmly over said cover and around the edges of said support; whereby, said core is held in a compressed condition while said cover is pulled taut and bonded to said support; and means for lowering said platform toward said heated table to apply additional pressure to said cover and to activate said heat-sensitive adhesive.

References Cited

UNITED STATES PATENTS

| | | | |
|---|---|---|---|
| 1,971,384 | 8/1934 | Ritter | 156—213 |
| 2,620,854 | 12/1952 | Wetherell | 156—480 |
| 2,774,410 | 12/1956 | Davies | 156—216 |
| 2,937,689 | 5/1960 | Peterson | 156—216 X |

FOREIGN PATENTS

| | | |
|---|---|---|
| 198,937 | 8/1958 | Australia. |

EARL M. BERGERT, *Primary Examiner.*

H. F. EPSTEIN, *Assistant Examiner.*